July 16, 1929.  C. W. HEBERT  1,721,483
STEAM TRAP, CONNECTION, AND VALVE THEREFOR
Filed July 9, 1925   2 Sheets-Sheet 2
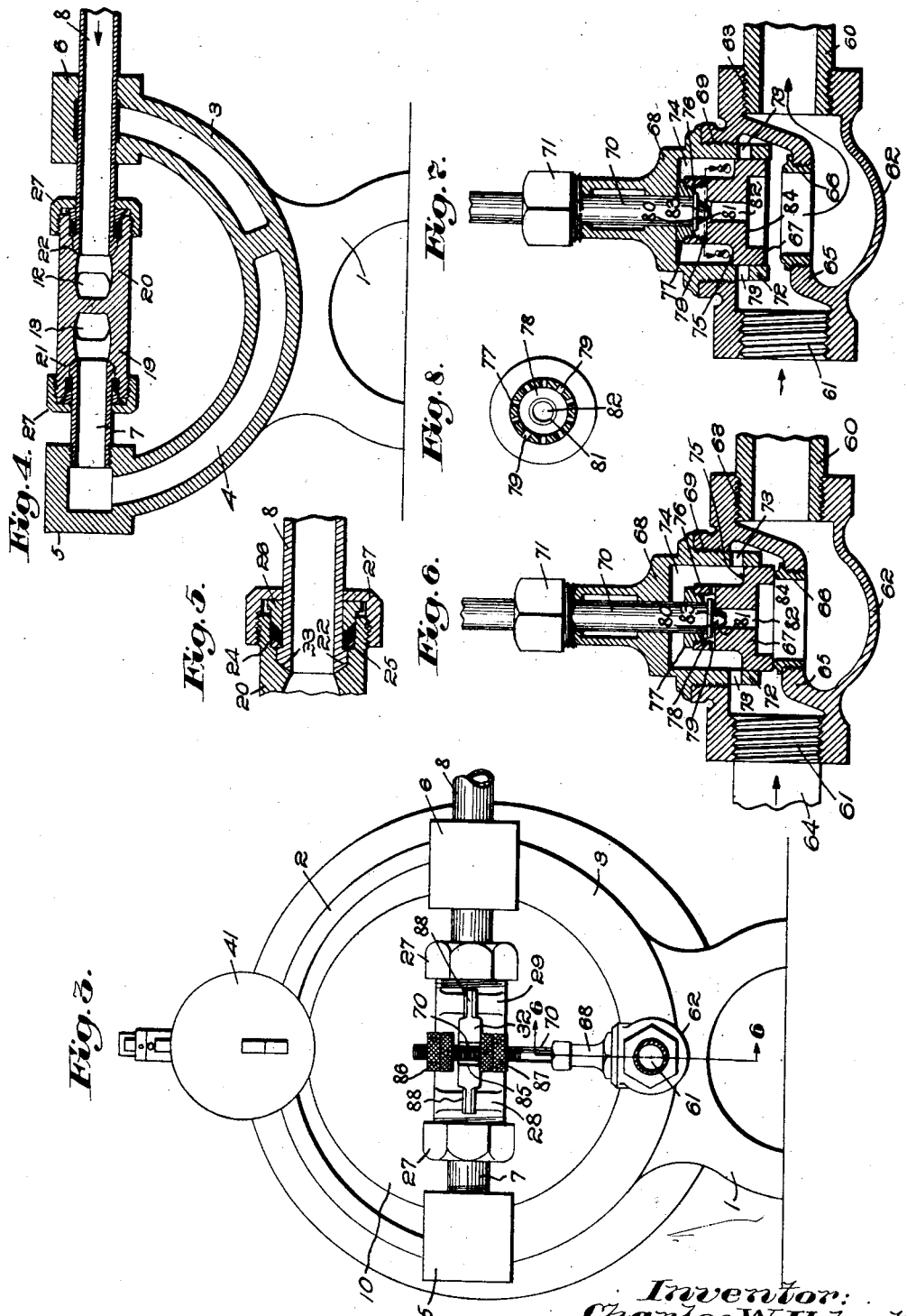

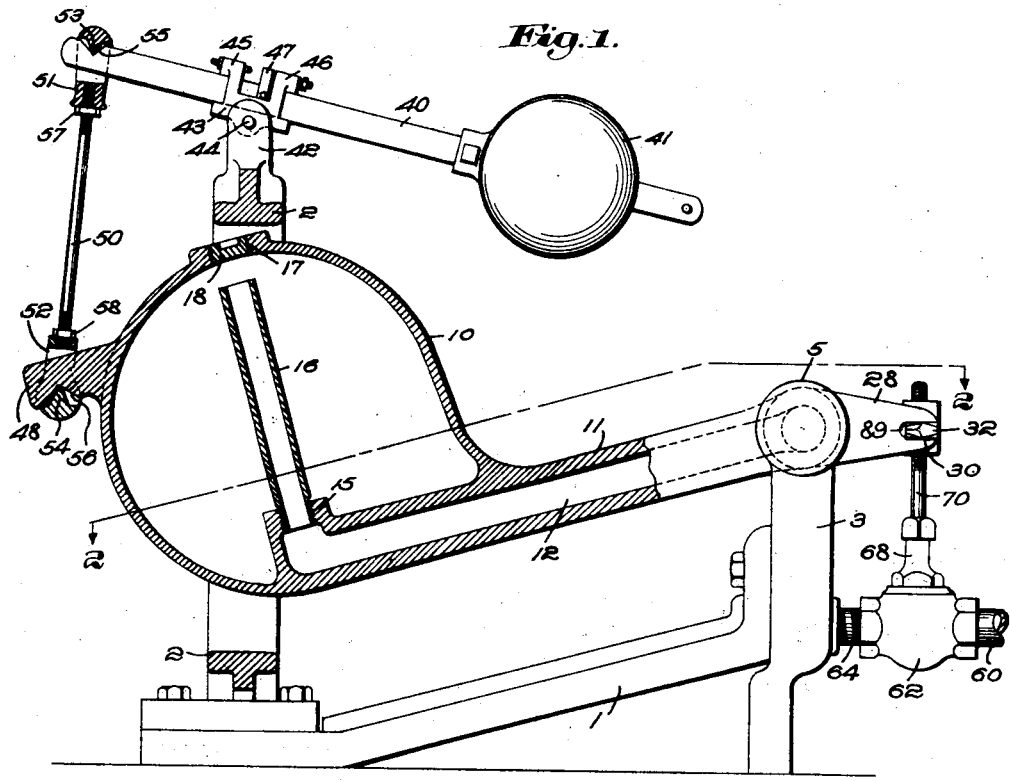

Patented July 16, 1929.

1,721,483

UNITED STATES PATENT OFFICE.

CHARLES W. HEBERT, OF NASHUA, NEW HAMPSHIRE, ASSIGNOR TO BUNDY STEAM TRAP CO., OF NASHUA, NEW HAMPSHIRE, A CORPORATION OF NEW HAMPSHIRE.

STEAM TRAP, CONNECTION, AND VALVE THEREFOR.

Application filed July 9, 1925. Serial No. 42,498.

This invention relates to steam traps, and to valves of general utility but particularly adapted for use therewith, and aims to provide a more efficient and otherwise improved construction and mode of operation for such devices.

In the accompanying drawing illustrating by way of example one embodiment of my invention:

Fig. 1 is a view partly in side elevation and partly in vertical section of a steam trap embodying one form of my invention;

Fig. 2 is an approximately horizontal section, upon the line 2—2 of Fig. 1;

Fig. 3 is an end elevation of the device shown in Fig. 1;

Fig. 4 is a vertical section upon the line 4—4 of Fig. 2;

Fig. 5 is a detail upon an enlarged scale of certain parts shown in Fig. 4;

Fig. 6 is a vertical section through the steam valve, taken on the line 6—6 of Fig. 3, the valve being in closed position;

Fig. 7 is a view similar to Fig. 6 but showing the valve in open position; and

Fig. 8 is a detail section on the line 8—8 of Fig. 7.

My invention as to many of its features is applicable not only to return traps or lifting or pumping traps, but also to separating or tank traps, but for simplicity of disclosure and description I shall herein describe the same as used with a separating trap without, however, limiting my invention thereto.

Referring more particularly to the drawings, the steam trap there shown by way of illustration of my invention comprises a suitable base or tripod 1 for supporting the various parts of the trap, said base together with the ring 2 and partial ring or yoke 3 comprising a frame for the trap.

The yoke 3 is hollow throughout at least one of its arms, herein that shown at the left, Figs. 3 and 4, providing the steam and condensation outlet or passage 4 from the trap to the valve hereinafter described, said yoke terminating in suitable heads 5, 6. Extending inwardly from the head 5 and in communication with the passage 4 is a trunnion tube 7 forming one bearing for the tilting trap. The other head 6 has extending through it a tube or pipe 8 the inner end of which constitutes a further bearing for the trap. Said pipe 8 has a tight fit in the head 6 and is prevented from turning relatively thereto by any suitable means (not shown) but is permitted such longitudinal movement with respect to the head as may arise from expansion. Water of condensation from any usual source is received by the trap through said pipe 8, said pipe thus constituting the inlet for the water, which preferably enters by gravity and under such steam pressure as exists in the source from which it is received. Suitable check valves may be provided, not necessary here to illustrate, at any convenient points intermediate the trap and the water source or return supply.

The trap proper, as best seen in Figs. 1 and 2, comprises a receiver or bowl 10 which may be of generally spherical or other suitable shape. It has heretofore been customary in certain traps to employ as a water of condensation inlet and as an outlet a pair of tubes tapped into the bowl at one of their ends and having threaded connection at their opposite ends with a rocking sleeve supporting the trap for tilting movement. Such a construction is shown, for example, in the United States patent to Sabin 1,425,340, August 8, 1922, for a pumping trap.

Such threaded connections have been found objectionable under certain conditions. To avoid such objection, in accordance with my present invention, I cast or otherwise form integrally with the bowl an arm 11 of a cross sectional area sufficient to contain the water and steam inlet passage 12, and the water outlet or discharge passage 13. Said water and steam inlet passage 12 is extended longitudinally into the interior of the bowl where it is provided with an upwardly directed opening 15 into which is tapped a tube 16 extending upwardly to a point adjacent the top of the bowl. Said tube 16 may conveniently be inserted or removed through the core hole 17, normally closed by the threaded plug 18. The water outlet passage 13 terminates substantially flush with the bottom of the bowl as indicated at 14, Fig. 2, whereby the water of condensation may be discharged through said passage 13 having the mouth 14, thence through tube 7 and passage 4 in the yoke to the discharge valve to be described later.

At its outer or right hand end, Figs. 1 and 2, the bowl arm 11 is provided with an integral head having oppositely extending bosses, elbow-like portions or elbows 19, 20 affording communication respectively between the discharge passage 13 and tube 7, and between the inlet water passage 12 and inlet water tube 8. The adjacent ends of said tubes 7, 8 are received in said elbows 19, 20 respectively, the latter being rockable on said tubes as trunnions.

To provide tight joints said tubes or trunnions are formed at their ends with flanges 21, 22 having their outer faces beveled substantially in the manner most clearly seen in Fig. 5 at 23. Said elbows are similarly formed interiorly to fit over said flanges, forming a ground joint, the passages in said elbows terminating flush with the passages in said tubes 7, 8. In this manner there is no portion at the inner ends of said trunnion tubes or of the elbows which projects into the path of the water and steam and which might be acted upon in such a way as to tend to separate the joints. A continuous passage free from all projections at the joint is thus provided. Such construction is desirably used in conjunction with the liquid joint disclosed in the patent to Littlefield 1,164,537, dated December 14, 1915.

As the construction of the elbows and associated parts at the opposite sides of the trap is desirably the same a description of one of such sets of parts, with reference to the larger scale Fig. 5 will suffice, both sets being fully shown, however, in Fig. 4. Referring to said Fig. 5, suitable packing rings 24 surround the trunnion tube, bearing on one side against the outer face of the flange 22 and against the vertical wall of an annular recess 25, see Fig. 5, formed in the adjacent portion of the elbow. On their opposite sides said packing rings are suitably compressed by a gland 26, which may be adjustably held in position by the cap 27 threaded upon the outer end of the respective elbow portion 19 or 20.

Also formed integrally with the bowl 10, the arm 11 and elbows 19, 20 are the forwardly projecting lugs 28, 29, see Figs. 1 and 2, formed with recesses 30, 31 at their outer ends for supporting the steam valve operating cross arm 32 in a manner more fully described hereinafter.

It will thus be seen that all the main moving parts of the trap are integrally formed, as by casting, in a single piece. In this manner a number of exterior, threaded connections are eliminated whereby possibility of leakage of steam or water is avoided, and the trap rendered more efficient and also there is secured a perfect alignment of elbows due to machining the bowl in one set up.

The movement of the bowl 10 is governed by means of a tilting lever 40, see Fig. 1, having an adjustable weight 41 adjacent one end and supported at an intermediate point preferably for longitudinal shifting as well as pivoting movement. Intermediate the lever 40 and an ear 42 on the ring 2 is a rocking member 43 pivoted at 44 to said ear. The lever is longitudinally slidable in as well as rockable with said rocking member, the latter preferably being provided with ball bearings or like anti-friction devices for the lever and with shock absorbing means 45, 46 cooperating with a lug or stop 47 upon the lever to cushion the trap at both limits of its tilting motion. Said rocking member and associated anti-friction and shock-absorbing devices are preferably similar to those fully shown and described in said Sabin Patent 1,425,340.

At its end opposite to that carrying the weight, the lever 40 is connected through intermediate means with an ear or lug 48 formed on the bowl 10. Heretofore it has been customary to employ for such purpose a link pivoted at its opposite ends to the lever and to said ear by pins or like cylindrical bearings. Such construction has been found objectionable in some instances due to the relatively large bearing surfaces and resultant friction, particularly if the parts become corroded as is not unlikely to happen due to the conditions under which the device is frequently employed. I therefore desirably employ a novel form of connecting means intermediate the lever and bowl lessening the friction heretofore present and rendering the tilting action of the bowl still more sensitive, prompt and actively responsive to predetermined conditions of the water in the bowl.

As best seen in Fig. 1, said connecting means herein includes a rod or link 50 having threaded engagement at its opposite ends with a pair of oppositely disposed eyes 51, 52. Said eyes, which may be generally similar, are formed interiorly with wedge-like or knife-edge bearings 53, 54, the edges of which contact with the bottom of substantially V-shaped recesses 55, 56 oppositely arranged near the end of the lever 40 on its upper face and in the lower face of the ear 48 respectively. The link 50 by reason of its threaded connection with said eyes 51, 52 may be adjusted relatively to them to afford the desired leverage, lock nuts 57, 58 being desirably employed to hold the link and eyes in adjusted position. The described construction affords a positive connection between the trap and tilting lever or counterweighting means, with a minimum of bearing surface for the moving parts, free from any lost motion, and one which will function efficiently under all conditions and will not be obstructed in its operation by corrosion or wear. It also aids materially in dismantling or assembling the trap.

The water of condensation is discharged from the trap with the steam pressure behind it, passing from the interior of the bowl out through a valve casing 62, see particularly Figs. 6 and 7, having a threaded opening 61 to receive a connection 64 tapped into the yoke 3 and in communication with the outlet passages 4, 13 from the interior of the bowl. The water of condensation flows in the direction indicated by the arrow in said Figs. 6 and 7. At the opposite side of the valve casing is the outlet 63 to which may be secured any desired pipe connection 60.

Referring now particularly to Figs. 6, 7 and 8, there is provided within the valve casing 62 a partition 65 having a bushing 66 forming a seat for the main valve disk 67. Said valve disk has a sliding fit within a bonnet or housing 68 threaded at 69 into the upper portion of the valve casing 62 and longitudinally apertured to receive the valve stem 70. Said valve stem is suitably packed at the upper end of said housing as by a packing ring and gland, which may be generally similar to that shown in Fig. 5, and which are held in place by the adjustable nut or cap 71.

Said housing 68 is provided at its lower extremity with an annular flange 72 in which is drilled one or more, preferably a series, of radial openings 73 affording communication between the interior of the valve casing 62 and the hollow interior or chamber 74 of the housing 68. With the valve in closed position as illustrated in Fig. 6 the steam pressure is thus admitted directly into said chamber 74 through said radial openings 73 so as to act upon the upper face 75 of the valve disk 67, holding it closed under pressure.

Since the valve is thus held closed under pressure it would ordinarily be necessary in opening the valve, as in most valves of which I am aware as heretofore having been employed for the purpose, first to move it against such pressure, which tends to retard opening of the valve and to act as a drag upon the bowl, delaying its prompt tilting action. According to my present invention, however, I have provided novel means of marked simplicity over the prior art, whereby the steam pressure tending to keep the valve shut is partially or wholly neutralized or overcome prior to the actual opening of the main valve.

For said purpose the main valve disk 67 is extended upwardly within the chamber 74 and is axially recessed at its upper end to provide an annular flange 76. Said flange is threaded to receive the closure nut 77 through which the valve stem 70 extends. There is provided below said nut 77 and within the flange 76 an auxiliary chamber 78 in communication by means of one or more, preferably a circumferential series of openings 79, see particularly Fig. 8, with the larger chamber 74. The valve stem 70 is itself formed at its lower end with a beveled tip 80 constituting an auxiliary or pressure-equalizing valve adapted to close into a like formed seat 81 in the main valve disk 67, shutting off the axial passage 82 in the latter, said passage extending through the valve to provide communication between the inner chamber 78 and the main valve passage in the bushing 66. Within said inner chamber 78 the valve stem 70 is provided with a flange 83 operatively connecting it to the valve but permitting a slight relative movement or lost motion between the stem and valve.

Assuming that the valve, which is adapted for use in varying relations, is to be used in connection with a steam trap, it is obvious that the latter may be of any suitable type. The valve is, however, peculiarly adapted for cooperation with a steam trap such as herein represented. Its operation is as follows.

In Fig. 6 it may be supposed that the receiver or bowl 10 is in its raised position, where it is held by its weighted lever. The valve is then closed, and is held in such position by the steam pressure acting through the water of condensation upon the upper face 75 of the valve and also by the weight of the bowl. When the bowl has filled with water to the predetermined extent it tilts downwardly, the valve operating lugs 28, 29 are swung up and the valve stem 70 is consequently raised, all other parts of the valve remaining momentarily at rest. The auxiliary valve 80 is thus lifted from its seat 81, admitting the steam pressure in the chamber 74 through the inner chamber 78 and downwardly through the axial passage 82 in the main valve 67. The steam is thus permitted to act upwardly against the lower face 84 of the latter. The pressure upon the top of the main valve is thus relieved, counteracted, or balanced and may be wholly neutralized or overcome, dependent upon the relative areas of the valve surfaces 75 and 84. Desirably, and in the illustrated form, said surfaces are of such extent that the pressure on the opposite sides of the valve is substantially equalized.

Continuing its upward motion the valve stem 70 engages with its flange 83 the lower face of the nut 77 and thus lifts the main valve into its open position, substantially as shown in Fig. 7. The water of condensation may then pass directly through the main valve bushing 66, then through the casing 62, the outlet 63 therein, and pipe connection 60 to the desired point.

In closing, a reverse operation takes place, the main valve stem and valve at first descending together, the latter by gravity, the pressure upon the opposite sides of the valve still being equalized since the auxiliary valve remains open. When the main valve has seated the stem then moves down relatively thereto and the auxiliary valve 80 again closes into its position shown in Fig. 6. From the foregoing it will be seen that I have provided a balanced or pressure-equalized valve, herein the discharge valve, which is extremely easy to operate, thereby increasing the general efficiency of the trap. Furthermore the disclosed construction does away with gaskets which are generally used with this type of valve, and the valve operates satisfactorily over a large range of pressure. By means of said auxiliary or balancing valve a main valve of larger size may be employed, thus giving a full free discharge area.

The ease of operation of the trap may be still further increased by means of a novel connection between the cross arm 32, the valve stem 70, and the lugs 28, 29 at the forward end of the bowl arm 11. As best seen in Figs. 1, 2 and 3, said cross arm is formed with a vertical channel 85 on its outer face, see particularly Fig. 3, in which the valve stem is received, said cross arm being positioned intermediate the pairs of check and lock nuts 86, 87 adjustably threaded upon the valve stem. Said open channel 85 enables the valve stem to be inserted or removed without having to remove the arm and avoids the use of screws which are decidedly objectionable particularly if the parts become corroded, as is not unlikely to happen due to the conditions under which the device is frequently employed. Assembling of the valve is thus facilitated and likelihood of damage to the parts decreased. Furthermore, fewer parts are required, which is a great and obvious advantage.

At its opposite ends said cross arm is formed with fingers 88 of approximately diamond shape in cross section providing upper and lower bearing edges 89, 90 engaging the opposite faces of the recesses 30, 31 in the lugs 28, 29 respectively. In this manner pivoting movement is permitted between said lugs and the cross arm, with a minimum of attendant friction.

My invention is not limited to the illustrative embodiment thereof shown and described herein, its scope being set forth in the following claims.

Claims:

1. In a steam trap, a movable receiver, a weighted lever for controlling the movements thereof, connections between said receiver and lever including a link member, a downwardly extending knife-edge bearing at the upper end thereof, a bearing surface on the lever with which said bearing engages, a similar but oppositely extending bearing at the lower end of said member, a cooperating bearing surface on the receiver, said bearing surfaces being constructed and arranged to prevent displacement of the bearings relative thereto and being adapted to function with a minimum of friction.

2. In a steam trap, a support including a yoke having a hollow arm providing a discharge passage, yoke heads at the upper end of said arms, an inwardly projecting tube on one of said heads and communicating with said discharge passage, an oppositely extending tubular member supported in the other yoke head and movable longitudinally with respect thereto for expansion purposes, a receiver, and an arm formed integrally therewith and having longitudinal intake and discharge passages and having at its outer end an integral head provided with opposed elbow-like portions rockable on said tube and tubular member as trunnions and connecting the intake and discharge passages of said arm with said tubular member and said tube respectively.

3. A steam trap having a support including trunnion tubes providing steam and water inlet and outlet passages, a receiver mounted for rocking movement on said tubes, a tilting lever for said receiver, said receiver including a bowl, a steam-and-water-passage-containing arm formed integrally therewith and an integral head at the outer end of said arm rockably received on said tubes and having passages connecting said passages in the arm to the trunnion tube inlet and outlet passages respectively, one of said passages in said arm being continued interiorly of the bowl to its central bottom portion, and a tube communicating with the inner end of said last mentioned passage and extended upwardly substantially diametrically of the bowl into the upper portion thereof.

4. A steam trap having a support including trunnion tubes providing steam and water inlet and outlet passages, a receiver mounted for rocking movement on said tubes, a tilting lever for said receiver, said receiver including a bowl, a steam-and-water-passage-containing arm formed integrally therewith and an integral head at the outer end of said arm rockably received on said tubes and having passages connecting said passages in the arm to the trunnion tube inlet and outlet passages respectively, one of said passages in said arm being continued interiorly of the bowl to its central bottom portion, a tube communicating with the inner end of said last mentioned passage and extended upwardly substantially diametrically of the bowl into the upper portion thereof, and connections between said receiver bowl and said tilting lever comprising a rod, opposite-disposed eyes at the ends thereof and knife-edge bearing means intermediate the respective eyes and the bowl and lever.

In testimony whereof, I have signed my name to this specification.

CHARLES W. HEBERT.